April 20, 1965  A. F. SEELIG, JR  3,179,065
EIGHT WHEEL RAILWAY CAR TRUCK STRUCTURE
Filed Jan. 22, 1962  3 Sheets-Sheet 3

INVENTOR.
Albert F. Seelig, Jr.
BY Walter L. Schlegel, Jr.

Witness:
C. H. Barrett

Atty.

United States Patent Office 3,179,065
Patented Apr. 20, 1965

3,179,065
EIGHT WHEEL RAILWAY CAR TRUCK STRUCTURE
Albert F. Seelig, Jr., St. Louis, Mo., assignor to Amsted Industries Incorporated, Chicago, Ill., a corporation of New Jersey
Filed Jan. 22, 1962, Ser. No. 167,658
8 Claims. (Cl. 105—183)

This invention relates to railway car trucks and more particularly to an eight wheel railway car truck.

Briefly, the present invention contemplates the provision of an eight wheel railway car truck comprising two identical four wheel truck structures interconnected for limited relative angular movement during travel of the truck along curved track. Each truck structure comprises spaced side frames supported at their ends upon two wheel and axle assemblies and interconnected intermediate their ends by a truck bolster. The two truck bolsters are interconnected by a pair of spaced span bolsters adapted to permit limited angling movement of the truck bolsters. The two span bolsters are interconnected intermediate their ends by a stub bolster formed with a center plate bearing portion adapted to be pivotally connected to a car body.

An object of the invention resides in the provision of an eight wheel railway car truck which is relatively inexpensive to manufacture and adapted to travel along curved track with minimum wheel flange wear.

Another object of the invention resides in the provision of an eight wheel truck comprising two identical self-aligning spring plankless four wheel trucks, each embodying side frames supported at their ends on wheel and axle assemblies and interconnected intermediate their ends by a truck bolster.

A further object of the invention resides in the provision of two span bolsters interconnecting the two truck bolsters, and a stub bolster interconnecting the two span bolsters.

The invention embodies other novel features, details of construction and arrangement of parts which are hereinafter set forth in the specification and claims and illustrated in the accompanying drawings, forming part thereof, wherein:

Figure 1:
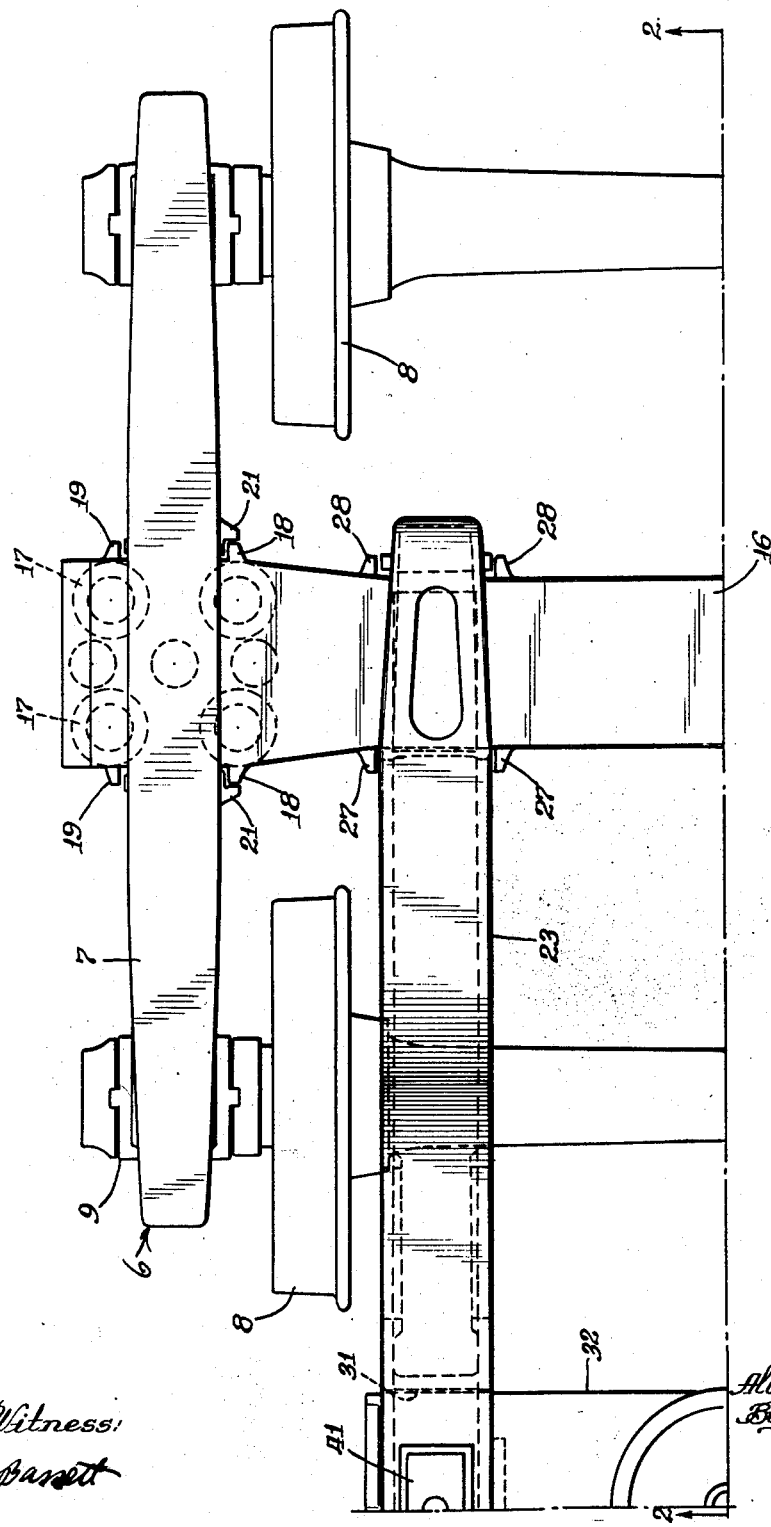
FIGURE 1 is a top plan view showing one-fourth of an eight wheel railway car truck embodying features of the invention, the truck being symmetrical about its longitudinal and transverse center lines.
Figure 2:
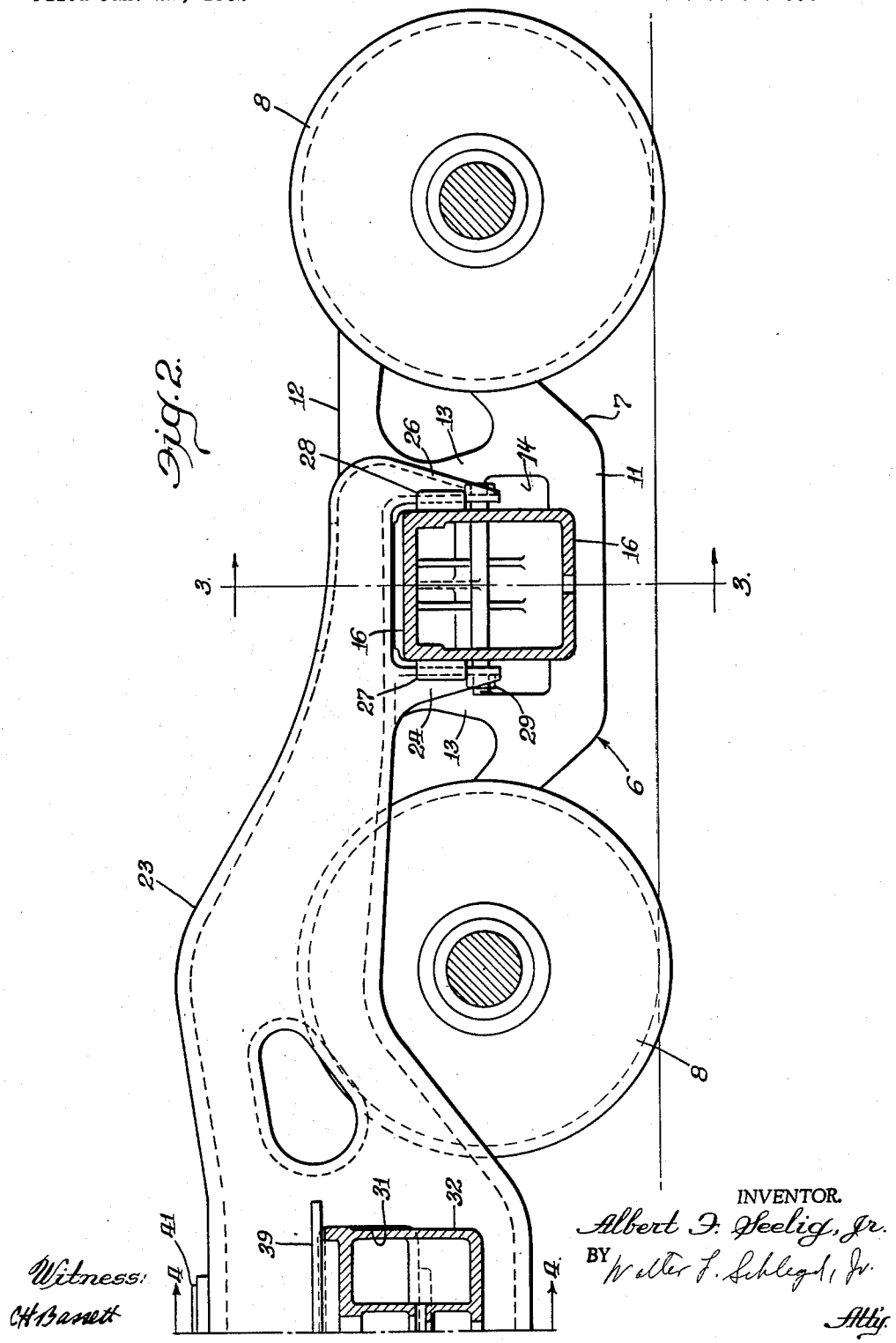
FIGURE 2 is a section taken along the line 2—2 of FIGURE 1.
Figure 3:
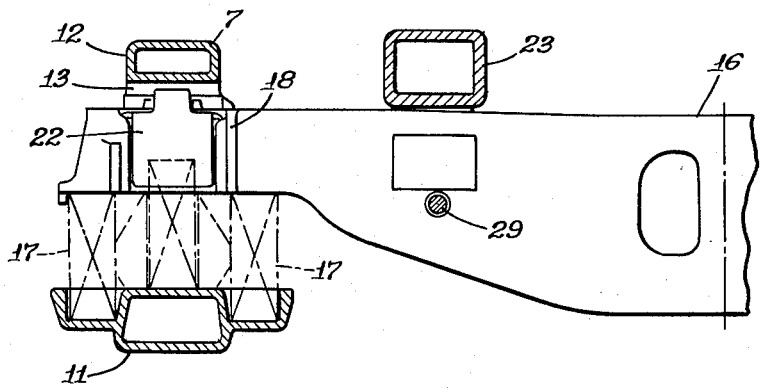
Figure 4:
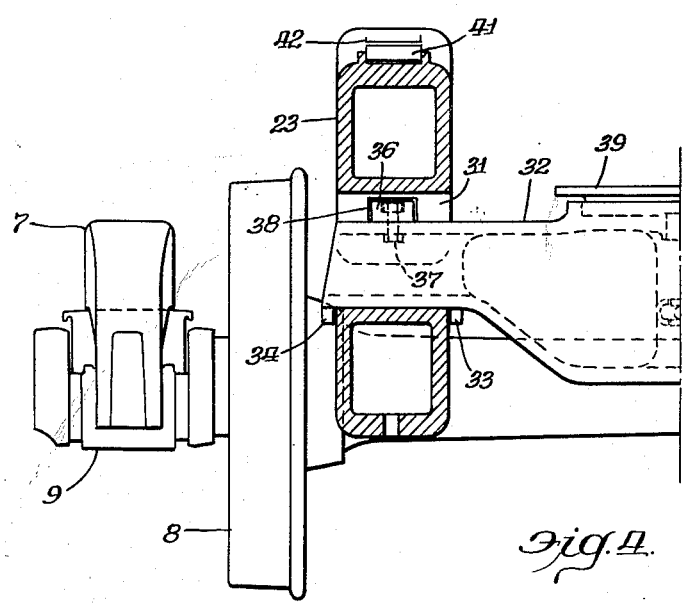

FIGURES 3 and 4 are transverse sections taken along the line 3—3 and 4—4, respectively, of FIGURE 2.

Figure 5:
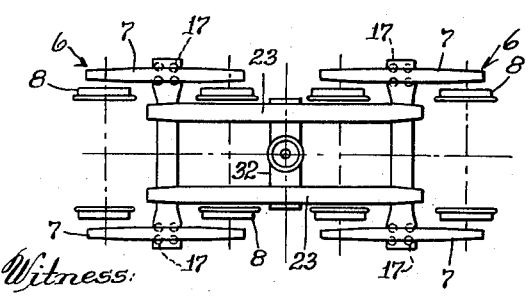

FIGURE 5 is a diagrammatic representation of the eight wheel railway car truck as described below.

Referring now to the drawings for a better understanding of the invention, the eight wheel railway car truck is shown as comprising two identical self-aligning spring plankless four wheel trucks 6. Each truck 6 comprises spaced truss type side frames 7 supported at their ends upon wheel and axle assemblies 8 journaled at their ends in roller bearing journal boxes 9. Each side frame 7 comprises tension and compression members 11 and 12 interconnected by spaced columns 13 to define a window 14 to receive one end of a truck bolster 16 resiliently supported on a spring group 17 seated on the tension member.

The ends of the truck bolsters 16 are provided with inboard and outboard guide lugs 18 and 19, respectively, to engage opposite sides of the side frame columns 13. Guide lugs 21 are provided on the side frames 7 to engage the ends of the adjacent inboard guide lugs 18. Friction shoe pockets are formed in the truck bolsters 16 to receive friction shoes 22 which are biased along inclined surfaces into frictional engagement against the columns 13 by means of compression springs, as disclosed in U.S. Patent 2,953,995 which is incorporated herein by reference.

The two trucks 6 are interconnected by a pair of identical span bolsters 23 having jaws 24 and 26 at their ends to straddle and engage their respective truck bolsters 16. The spacing between each set of jaws is, for example, approximately three-fourths of an inch greater than the width of the truck bolster engaged therebetween to permit limited angular movements of the truck bolsters relative to the span bolsters during travel of the trucks along curved tracks. Lugs 27 and 28 are provided on opposite sides of the truck bolsters 16 to straddle and engage opposite sides of the jaws 24 and 26. The ends of the span bolsters 23 rest upon the truck bolsters 16 and are secured against upward displacement by means of bolts 29 which extend through aligned apertures in the truck bolsters and the jaws 24 and 26.

The span bolsters 23 are formed with openings 31 to receive the ends of a stub bolster 32 formed with inboard and outboard lugs 33 and 34, respectively, to straddle and engage opposite sides of the span bolsters. Cross bars 36 are secured to the top sides of the stub bolster by means of bolts 37 and have their ends engaged in apertures 38 formed in the span bolsters to prevent displacement of the ends of the stub bolster from the span bolsters. A center plate 39 is mounted on the stub bolster for engagement against a car body. Side bearings 41 are provided on the span bolsters 23 for engagement by bearing members 42 provided on a car body.

I claim:

1. In an eight wheel railway car truck, two identical self-aligning spring plankless four wheel trucks, each comprising spaced truss type side frames having spaced columns, a truck bolster resiliently supported at its ends on said side frames between said columns, friction snubbing means interposed between said bolster and said columns, spaced span bolsters seated on and interconnecting the truck bolsters for limited angular movement, said span bolsters having bolster openings, a stub bolster having its ends seated on said span bolsters within said openings, and a center plate bearing surface on said stub bolster.

2. In an eight wheel railway car truck, two identical self-aligning spring plankless four wheel trucks, each comprising spaced truss type side frames having spaced columns, a truck bolster resiliently supported at its ends on said side frames betweens said columns, friction snubbing means interposed between said bolster and said columns, spaced span bolsters seated on and interconnecting the truck bolsters for limited angular movement, said span bolsters having bolster openings, a stub bolster having its ends seated on said span bolsters within said openings, and a center plate bearing surface on said stub bolster, and means detachably securing said stub bolster to said span bolsters.

3. In an eight wheel railway car truck, two identical self-aligning spring plankless four wheel trucks, each comprising spaced truss type side frames having spaced columns, a truck bolster resiliently supported at its ends on said side frames between said columns, friction snubbing means interposed between said bolster and said columns, spaced span bolsters seated on and interconnecting the truck bolsters for limited angular movement, said span bolsters having bolster openings, a stub bolster having its ends seated on said span bolsters within said openings, and a center plate bearing surface on said stub bolster, said span bolsters having jaws at the ends thereof straddling said truck bolsters.

4. In an eight wheel railway car truck, two identical self-aligning spring plankless four wheel trucks, each comprising spaced truss type side frames having spaced columns, a truck bolster resiliently supported at its ends on said side frames between said columns, friction snubbing means interposed between said bolster and said columns, spaced span bolsters seated on and interconnecting the truck bolsters for limited angular movement, said span bolsters having bolster openings, a stub bolster having its ends seated on said span bolsters within said openings, and a center plate bearing surface on said stub bolster, said span bolsters having jaws at the ends thereof straddling said truck bolsters, and means detachably connecting said jaws to the truck bolsters.

5. In an eight wheel railway car truck, two self-aligning spring plankless four wheel trucks, each comprising spaced truss type side frames having spaced columns, a truck bolster resiliently supported at its ends on said side frames between said columns, friction snubbing means interposed between said bolster and said columns, spaced span bolsters supported by and interconnecting the truck bolsters for limited angular movement, said span bolsters having bolster openings, a stub bolster having its ends supported by said span bolsters within said openings, and a center plate bearing surface on said stub bolster.

6. In an eight wheel railway car truck, two self-aligning spring plankless four wheel trucks, each comprising spaced truss type side frames having spaced columns, a truck bolster resiliently supported at its ends on said side frames between said columns, friction snubbing means interposed between said bolster and said columns, spaced span bolsters supported by and interconnecting the truck bolsters for limited angular movement, said span bolsters having bolster openings, a stub bolster having its ends supported by said span bolsters within said openings, and a center plate bearing surface on said stub bolster, and means detachably securing said stub bolster to said span bolsters.

7. In an eight wheel railway car truck, two self-aligning spring plankless four wheel trucks, each comprising spaced truss type side frames having spaced columns, a truck bolster resiliently supported at its ends on said side frames between said columns, friction snubbing means interposed between said bolster and said columns, spaced span bolsters supported by and interconnecting the truck bolsters for limited angular movement, said span bolsters having bolster openings, a stub bolster having its ends supported by said span bolsters within said openings, and a center plate bearing surface on said stub bolster, said span bolsters having jaws at the ends thereof straddling said truck bolsters.

8. In an eight wheel railway car truck, two self-aligning spring plankless four wheel trucks, each comprising spaced truss type side frames having spaced columns, a truck bolster resiliently supported at its ends on said side frames between said columns, friction snubbing means interposed between said bolster and said columns, spaced span bolsters supported by and interconnecting the truck bolsters for limited angular movement, said span bolsters having bolster openings, a stub bolster having its ends supported by said span bolsters within said openings, and a center plate bearing surface on said stub bolster, said span bolsters having jaws at the ends thereof straddling said truck bolsters, and means extending through apertures of the truck bolsters detachably connecting said jaws to the truck bolsters.

References Cited by the Examiner

UNITED STATES PATENTS

| 1,241,105 | 9/17 | Frindt | 105—183 |
| 1,276,636 | 8/18 | Frede | 105—183 |
| 2,242,371 | 5/41 | Orr | 105—183 |

LEO QUACKENBUSH, Primary Examiner.

ARTHUR L. LA POINT, Examiner.